United States Patent

[11] 3,542,440

| [72] | Inventors | Karl Brand;<br>Franz Kessler, Ebern, Germany |
|---|---|---|
| [21] | Appl. No. | 693,807 |
| [22] | Filed | Dec. 27, 1967 |
| [45] | Patented | Nov. 24, 1970 |
| [73] | Assignee | Kugelfischer George Schafer & Co.<br>Schweinfurt, Georg-Schafer-Str., Germany |
| [32] | Priority | Dec. 27, 1966 |
| [33] | | Germany |
| [31] | | No. K6,1032 |

[54] HIGH LOAD CAPACITY BEARING ASSEMBLY
13 Claims, 7 Drawing Figs.

[52] U.S. Cl. ............................................... 308/73
[51] Int. Cl. ........................................... F16c 33/12
[50] Field of Search .......................................... 308/73, 160, 26, 237

[56] References Cited
UNITED STATES PATENTS

| 1,445,188 | 2/1923 | Wadsworth | 308/160 |
| 2,224,652 | 12/1940 | Kingbury | 308/73 |
| 2,327,035 | 8/1943 | Gray | 308/237 |
| 2,384,589 | 9/1945 | Baldenhofer | 308/73X |
| 2,554,548 | 5/1951 | Albagnac | 308/237 |
| 2,642,370 | 6/1953 | Parsons | 308/N |
| 2,738,241 | 3/1956 | Von Mohrenstein | 308/73 |
| 3,056,709 | 10/1962 | Rising | 308/N |
| 3,061,384 | 10/1962 | Schaefer | 308/160 |
| 3,119,640 | 1/1964 | Laudig | 308/237 |
| 3,172,797 | 3/1965 | Bungardt | 308/237 |
| 3,259,441 | 7/1966 | Newell | 308/160 |
| 3,398,997 | 8/1968 | Wucherer | 308/2 |

FOREIGN PATENTS

| 322,402 | 12/1929 | Great Britain | 308/73 |

*Primary Examiner*—Wesley S. Ratliff, Jr.
*Attorney*—Stevens, Davis, Miller & Mosher ABSTRACT: A high load capacity bearing assembly for supporting a rotating member, including a plurality of bearing members in contact with the rotating member, the bearing surfaces of the bearing members being resilient and being adapted to form a thin film of lubricant between the bearing members and the rotating member upon rotation of the latter.

HIGH LOAD CAPACITY BEARING ASSEMBLY

BACKGROUND OF THE INVENTION

1. Field of the Invention

This invention relates to a bearing assembly and, more particularly, to such an assembly for supporting a rotating member of a relative high load.

2. Description of the Prior Art

It has already been proposed to provide bearing assemblies of the above-mentioned type, such as taught, for example, in German specification DAS 1,084,090. However, in these known arrangements, the bearing assemblies are not adapted to high loading. Therefore, when additional momentary pressure peaks are added to the high surface loads, such as in the application of bearings for rolling mills, the bearings fail, usually due to a fracture of the bearing shell.

Another problem encountered in these known arrangements is the support of a member having surfaces of a conical shape. Difficulties have arisen in particular due to the longitudinal expansion of the member to be supported under the increased operating temperatures which rise. Also, due to the particularly large loading of the bearing required, a relatively high starting torque is required.

SUMMARY OF THE INVENTION

It is an object of the present invention to overcome the difficulties set forth above by providing a bearing assembly for multisurface bearings which is adapted to accommodate high loads and additional momentary peak loads.

Briefly summarized, the present invention provides a high load capacity bearing assembly including a plurality of bearing members which, in their rest position, engage fully against the outer surface of the member to be supported. Each bearing member has a resilient bearing surface of a material which forms a thin lubricant between the bearing member and the rotating member upon rotation of the latter. Each bearing member has a load distribution in the direction of movement of the rotating member which extends from a maximum value at the middle of the support to zero at its two ends in both directions.

Each bearing member can take two forms. In one form it consists of an intermediate member fixed to a force distributing member, the intermediate member being provided with the resilient bearing surface which engages the member to be supported. This bearing surface can comprise an adhesive layer applied to the intermediate member, a layer of synthetic resin impregnated glass fiber fabric, an additional layer of adhesive and an additional outer layer consisting of a laminated foil of steel and white metal.

In its other form the bearing member can be in the form of a single unit with the bearing surface being similar to that described above.

It is a further object of the invention to provide a bearing assembly for rotating members having conical surfaces, which bearing assembly is not affected by longitudinal expansion of the rotating member under increased operating temperatures.

The latter object is achieved in the present invention by providing two bearing assemblies which include bearing members having conical bearing surfaces which cooperate with the conical surfaces on the supported member with one of the bearing assemblies being axially fixed and the other being axially movable against a fixedly supported resilient element.

Also in accordance with the latter arrangement, the axially movable bearing assembly is engaged by a hydraulically operated annular piston which slides in an annular cylinder and which permits the preloading of the bearings to be relieved during initial start-up of the supported member. Also, this piston-cylinder unit can be arranged in a manner to vary the contact pressure of the bearing members against the supported member.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
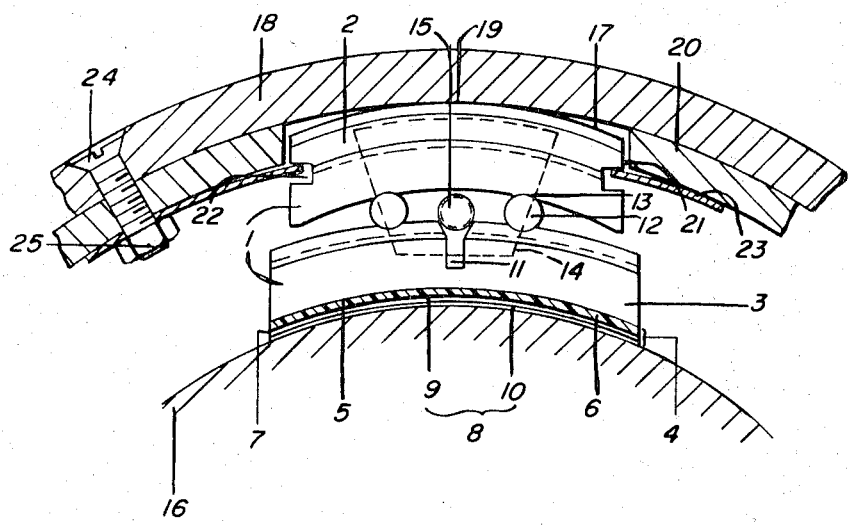
FIG. 1 is a front elevation, partially in cross section, of a first embodiment of a bearing assembly according to the invention, the nearer retaining plate being removed in the interest of clarity.

Referring to the drawings, and especially FIG. 1 thereof, a high load capacity resilient bearing member is shown by the reference numeral 1 and is disposed between a fixed retaining member 18 and a member 16 which is supported for rotation by the entire bearing assembly. The bearing member 1 comprises a force distributing member 2, a one-piece intermediate member 3, and a bearing shell 4.

The intermediate member 3 has a central transversely extending groovelike recess formed in the side thereof adjacent the force distributing member 2, and is supported with respect to the latter by means of two transversely extending rollers 12 arranged symmetrically with respect to the recess 11, and engaging in corresponding grooves formed in the force distributing member 2 and the intermediate member 3. The force distributing member 2 and the intermediate member 3 are fixed together by use of two segmental face components 14 which are provided on their upper and lower edges with dovetail projections which engage in corresponding recesses formed in the force distributing member 2 and in the intermediate member 3, the two face components 14 being connected together by screw 15.

The bearing shell 4 forming the bearing surface is made up of a first adhesive layer 5, an additional layer 6 of synthetic resin impregnated glass fiber fabric, a second adhesive layer 7 and an outer running surface layer 8. This outer surface layer 8, in turn, comprises a laminated steel white foil including an inner layer of steel foil 9 and an outer layer of white metal foil 10.

As shown in FIG. 1, the curvature of the intermediate member 3 and the shell 4 is substantially similar to that of the rotating member 16, and this engagement continues in the axial direction of the latter for the entire width of the intermediate member. The force distributing member 2 is curved greater than the corresponding inner surface of the retaining ring 18, and is provided with crowned upper surface 17 so that a substantial line engagement 19 occurs between the inner surface of retaining ring 18 and the outer surface of force distributing member 2, as shown.

At least three of the bearing members 1 are provided within the retaining ring 18, and each is enclosed laterally by two spacing segments 20. The force distributing member 2 is provided on each of its two side faces 21 with a transverse groove 22, each of which is engaged by the ends of leaf springs 23 disposed on a corresponding spacing segment 20, and being secured together with the spacing segment 20 by a screw 24 extending through the spacing segment and the retaining ring, and a nut 25.

Figure 2:
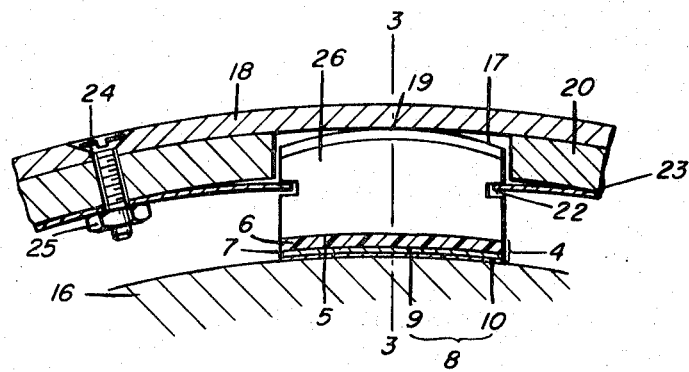
FIG. 2 is a view similar to FIG. 1 and showing a second embodiment of a bearing assembly according to the invention.
Figure 3:
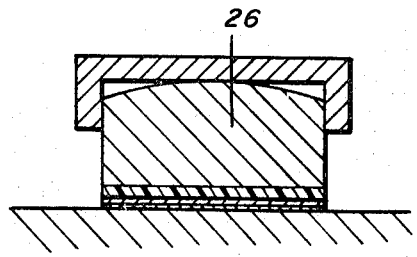
FIG. 3 shows a view taken on the line 3–3 of FIG. 2.

An alternate embodiment of the bearing member 1 is shown in FIGS. 2 and 3. As shown, the force distributing member and the intermediate member are combined into a single bearing member 26, omitting the face components 14, the screw 15 and the rollers 12, the remaining components being similar as in the embodiment of FIG. 1 and being identified by the same reference numerals. As shown in FIG. 3, the bearing member 26 engages the member to be supported in a straight line engagement in the axial direction of the latter as in FIG. 1.

Figure 4:
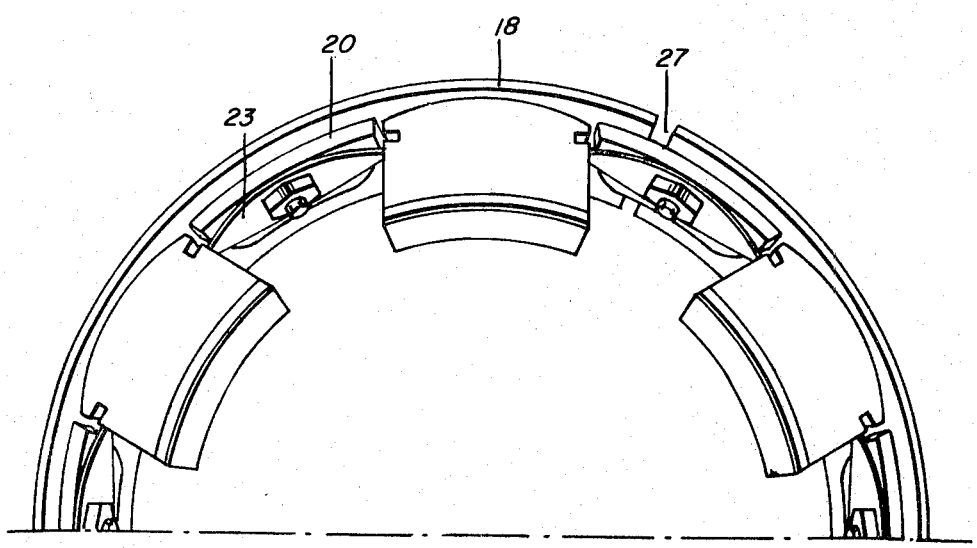
FIG. 4 shows a front elevation in perspective of the upper half of a cylindrical multisurface bearing assembly employing bearing members according to FIG. 2.

In FIG. 4 there is shown the upper half of a multisurface bearing assembly with six bearing members of the type corresponding to the embodiments of FIGS. 2 and 3. As seen, each bearing member is equally spaced by use of the spacing segments 20, the retaining ring 18 being provided with axial slit 27 which allows the rings to engage fully in the corresponding bore in the housing in which the bearing is provided.

The particular compositions of the various layers and the dimensions of the various components will now be described in detail, with particular reference to FIGS. 1 and 2. Specifically, the outer bearing layer 8 may consist of a laminated steel and white metal foil 9, 10. As an alternative, the layer 8 could comprise a foil of plastics when the bearing supports are to be employed in a water-lubricated bearing.

The layer 6 can be formed by a multilayer glass fiber fabric impregnated with synthetic resin and preferably the synthetic resin is a phenolic resin present in such quantity that the layer 6 is of approximately 65 percent by weight of glass fiber, and about 35 percent by weight of phenolic resin.

The adhesive in the layers 5 and 7 can consist of approximately 40 percent by weight of phenolic resin, approximately 40 percent by weight of feldspath powder, and approximately 20 percent by weight of acetone.

The steel white metal laminated foil 9, 10 which comprise the outer layer 8 preferably has a thickness of between 0.3 and 0.6 mm., and the ratio of the thickness of the white metal layer 10 to that of the steel layer 9 can lie between about 1:1 and about 1:1.5. If a synthetic resin foil is used as a substitute for the laminated foil 9 and 10, then the former can have a thickness of about 0.6 mm.

The supported member 16, the retaining ring 18, the spacing segments 20 and the leaf springs 23 are made of the usual metallic materials, and the segmental force distributing member 2 of FIG. 1 or the bearing member 26 of FIGS. 2—4 may be hardened.

In rest condition of the multisurface bearing assembly illustrated partially in FIGS. 1 to 4, the bearing members 1 or 26 lie with their bearing surfaces 4 fully in contact with the supported member 16. As soon as the latter member 16 rotates, a thin film of lubricant having a thickness of 0.3 to 1 microns is formed between its surface and the bearing surface 4 as a result of the inherent resilience of the surface 4. The layer of lubricant does not alter the predetermined distribution of pressure between the support 1 and the surface of the member 16, and the film of lubricant builds up even at low relative velocities and requires a minimum relative velocity of 0.25 meters per minute.

At the normal high running speed of 150 meters per second, the preloading of the bearing supports remains at around 100 to 170 kg. per square centimeter, and can be maintained throughout the whole speed range at the same force, which makes it possible for the member 16 to rotate without any play. The surface loading of the bearing supports 1 is 1250 kg. per square centimeter. In this connection the direction of rotation of the member 16 is unimportant, i.e., the bearing assembly operates in both directions of rotation of the member 16 which is to be supported.

Although the bearing supports 3 or 26 are shown with a cylindrical bearing surface in FIGS. 1—4, it is to be understood that this surface can vary in its shape. For example, it may be of a flat shape or of a conical shape, in which case the undersides of the intermediate member 3 or the bearing member 26, and, of course, the corresponding bearing surface 4, will be shaped in a similar manner.

The method of manufacturing the bearing members 1 or 26 will now be described with reference to FIGS. 6 and 7.

Specifically, the adhesive layer 5 is initially applied to the underside of the bearing member 26 or the intermediate member 3 after the latter has been assembled, together with the force distributing member 2. The layer 6, which is made up of one or more layers of glass fiber impregnated with synthetic resin, as discussed in detail above, is then applied to the adhesive layer 5 and is, in turn, provided with an adhesive layer 7. The outer layer 8 is then applied to this latter adhesive layer 7 and is made up of a laminated steel white metal foil 9 and/or 10, or of a synthetic resin foil also as discussed in detail above.

In this preassembled condition the layer 6, together with the layers 5 and 7, has a thickness of approximately 2 to 5 mm. depending upon the size of the bearing member 26 or intermediate member 3. The layers 5—8 form the bearing surface 4 which is rigidly attached to the intermediate member 3 or the bearing member 26 by use of a press tool or die as shown in FIGS. 6 and 7, it being understood that the press tool matches the outer diameter of the bearing member or intermediate member and the diameter of the member to be supported.

Figure 6:
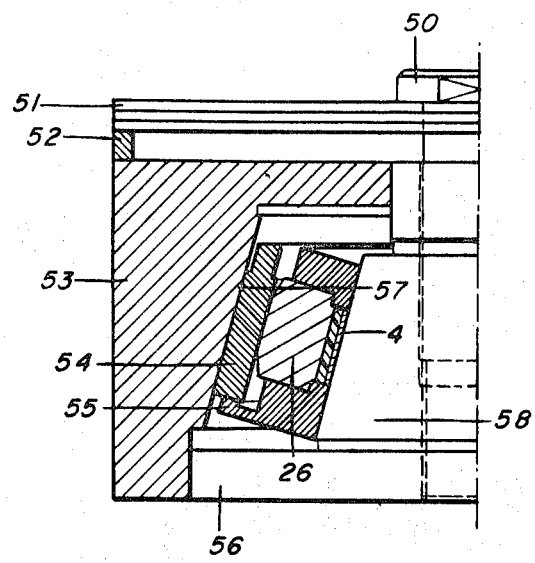
FIGS. 6 and 7, respectively, show cross sections through press tools or dies for the manufacture of conical and of cylindrical bearing members according to the invention.
Figure 7:
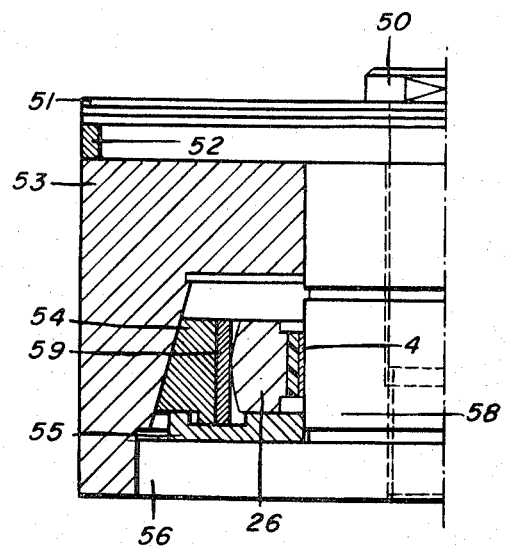

The die shown in FIGS. 6 and 7 is capable of receiving up to eight bearing members, and the latter along with the loosely adhering running surfaces 4, are preloaded in the die by means of a spring loading or hydraulic pressure and are brought in an oven to a temperature of 80°C. which is increased up to a temperature below the softening temperature of the material of the running surface, which in the case of a laminated steel white metal foil can extend up to 180°C., these temperatures being independent of the adhesive used in the synthetic resin impregnated material.

The upper temperature limit must not be exceeded, since the white metal begins to flow at 180°C. Also, the temperature of 80°C. represents the minimum setting of the oven to avoid increasing the total process time as a result of the necessary heating up time of the oven.

In the raising of the temperature, the preloading of the press tool or die is readjusted after each temperature increase of 5°C. passing through the range from 100° to 120°C., the readjustment being such that the pressure on the bearing supports lies 20 percent above the pressure which was set initially at about 400 kg. per square centimeter. This readjustment of the pressure is necessary on account of the plastic nature of the adhesive layers and of the synthetic resin impregnated glass fiber fabric layer between them over the given temperature interval. The raising of the pressure by 20 percent of its original value is necessary as otherwise continuous readjustment is necessary to keep up with the plastic behavior.

From 120°C. onwards there is no further readjustment of the pressure and the further increase in temperature serves to cure the layers 5—7. During the heat treatment each bearing support 1 is pressed in a die against a core having a section which matches in its dimensions the dimensions of the member to be supported. Therefore, because of its plastic deformability, the bearing surface formed matches exactly the dimensions of the member to be supported. When the adhesive of the layers 5 and 7 and the layers 6 of phenolic resin impregnated glass fiber is in the fully cured condition, the bearing surface 4 has the inherent resilience mentioned earlier.

Figure 5:
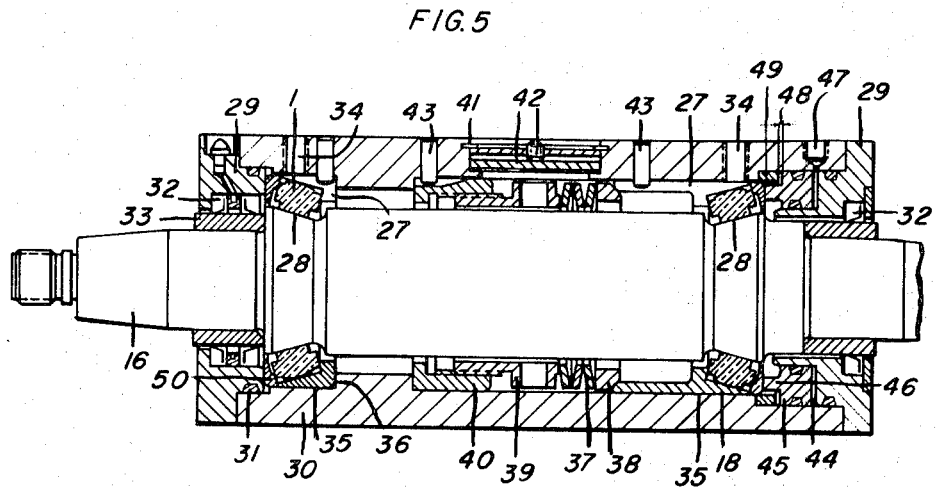
FIG. 5 is an axial sectional view of a structure according to the invention for supporting rotating members both axially and radially.

FIG. 5 depicts the bearing assembly of the present invention used in connection with hydrodynamically operating bearings for the high load capacity support of a rotating spindle 16 in both the axial and radial directions thereof. In particular, spindle 16 includes two conical oppositely divergent running surfaces 28, and is mounted in a housing 30 closed on both sides by covers 29. The latter are sealed in a fluid-tight manner both to the housing 30 and to the portions of the spindle 16 which extend through them by means of an O-ring 31 and an annular seal 32 at each end thereof, the seals 32 each engaging a sleeve 33 surrounding the spindle 16 near each end thereof. Bores 34 are provided in housing 30 through which the lubricant is let in and out. Each of the hydrodynamically operating bearing assemblies are shown at 35, and each include a plurality of spaced bearing members 26 or 3 arranged according to the embodiments of FIGS. 2—4 and a retaining ring 18, it being understood that the bearing members are spaced by means of the spacing members and leaf springs, and each has a bearing surface 4, as previously disclosed. These bearing members, including their corresponding bearing surfaces 4, are curved to match the curvature of the corresponding surfaces 28 of spindle 16.

The retaining rings 18 have a groove of generally frustoconical cross-sectional shape formed therein to receive the bearing members, which, therefore, extend at an angle with respect to the longitudinal axis of the spindle 16. As in the earlier embodiments, the retaining rings 18 are provided with an axial slit 27 to facilitate insertion into the housing 30. The ring 18 on the left side of the assembly as shown in FIG. 5, is rigidly clamped between an annular shoulder 36 formed on the housing 30 and between a cover disc 50 abutting the left-hand cover 29 as shown.

At least one spring member 37 is provided between the housing 30 and spindle 16, and urges the bearing assembly 35 on the right side of FIG. 5 to the right by engaging, at one end, an intermediate ring 38 which in turn engages the end of retaining ring 18 being axially movable. It is particularly noted that the latter retaining ring is positioned so that it engages the support assembly 1 or 26 arranged in a frustoconical cross-sectioned shape on the side of the smaller diameter.

The other end of the spring member 37 engages a circular nut 39 which is adjustably screwed in a threaded ring 40 axially fixed and nonrotatably mounted in the housing 30. Therefore, adjustment of circular nut 39 adjusts the preloading of the resilient springs 37 on the retaining ring 18 formed to the right of FIG. 5. The nut 39 is accessible through a bore 41 formed in the housing 30 which is sealed off by the cover 42, as shown, pegs 43 being provided which prevent the rotation of the retaining ring 18 and the threaded ring 40.

It is thus seen that in the present arrangement, the rotating spindle 16 is mounted both in the axial and radial directions, and due to the fact that one of the bearing assemblies 35 is subjected to spring loading, it is possible to compensate for changes in length of the spindle 16 due to the increased operating temperatures by simply adjusting the preloading of the bearings.

In order to reduce the high starting torque which the spindle 16 would required due to the relatively large bearing preloading of between 200 and 2000 kg., provision is made to temporarily relieve the preloading of the bearing assembly 35 on the right side of FIG. 5.

In particular, an annular piston 45 is provided which is mounted for axial movement in an annular cylinder 44 defined by the cover 29 and by the housing 30. A projection 46 is formed on piston 45 and is adapted to engage a cover disc 50 which is in abutment with the retaining ring 18 of the right bearing assembly 35. In this manner the piston 45 can be hydraulically actuated by flowing oil under pressure through the pressure connection 47 formed in housing 30 before the spindle 16 is actuated. Therefore, the piston 45 is displaced over the distance 48 determined by the width of the ring 49, and the retaining ring 18 of the right bearing assembly 35 is displaced for a substantially similar distance against the action of the spring members 37. Therefore, the preloading of both the left and right-hand bearing is eliminated. The distance 48 can lie between 0.05 and 0.4 mm. according to the size of the bearing. After the spindle 16 has begun rotation and turned once or twice, the hydraulic pressure acting on piston 45 through the bore 47 may then be relieved and the bearing is once more subject to preloading.

Under certain circumstances, it is desirable to preload the bearings 35 with an adjustable hydraulic pressure. This is possible in the arrangement of the present invention shown in FIG. 5 by simply interchanging the piston-cylinder unit 44-45 and the resilient members 37 with respect to the retaining ring 18 of the right bearing assembly. Therefore, the momentary relief of load during starting of the spindle 16 would be effected by releasing the piston 45 and allowing the resilient members 37 to urge the ring 18 from right to left as shown in FIG. 5. However, when sufficient starting torques are available, this momentary relief of the loading is not necessary.

Of course, other variations of the specific construction and arrangement of this type device herein disclosed can be made by those skilled in the art without departing from the invention as defined in the appended claims.

We claim:

1. A high load capacity bearing assembly comprising a fixed retaining ring; a plurality of bearing members spaced along the inside of said retaining ring, the outer surface of each of said bearing members being curved to engage the inner surface of said ring in a substantially line contact so that the load distribution in the direction of rotation of the supported member extends from a maximum value at said line of engagement to zero at the ends of said bearing members, and the inner surface of each of said bearing members corresponding in shape to the shape of the member to be supported; and a bearing body formed on the inner surface of each of said bearing members and adapted to engage the outer surface of the member to be supported, said bearing body comprising an adhesive layer connecting it to said inner surface, a layer of synthetic resin impregnated glass fiber fabric, a second adhesive layer and an outer running surface layer.

2. The bearing assembly of claim 1, further comprising a plurality of spacing segments secured to said retaining ring, a spacing segment being disposed between each adjacent pair of bearing members.

3. The apparatus of claim 2, wherein each of said bearing members is provided with a transverse groove on each side face thereof, and further comprising a plurality of leaf springs secured to said retaining ring, the free end of each of said leaf springs engaging in the groove of a corresponding bearing member.

4. The bearing assembly of claim 1, wherein each of said bearing members is in the form of a force distributing member engaging said ring and an intermediate member cooperating with said force distributing member, said bearing body being formed on said intermediate member.

5. The bearing assembly of claim 4, wherein said intermediate member is provided on its surface facing said force distributing member with a central transversely extending groove, and further comprising two transversely extending rollers respectively engaging said intermediate member and said force distributing member and disposed symmetrically with respect to said groove.

6. The bearing assembly of claim 1, wherein said outer surface layer comprises a laminated foil of steel and white metal, the white metal foil being disposed outermost with respect to said steel foil.

7. The bearing assembly of claim 1, wherein said outer running surface layer is made of a synthetic resin foil in the form of Ferobestos foil.

8. The bearing assembly of claim 1, wherein said layer of glass fiber fabric is in the form of a multilayer glass fiber fabric impregnated with synthetic resin.

9. The bearing assembly of claim 1, wherein said layer of glass fiber fabric comprises a phenolic resin impregnated glass fiber fabric.

10. The bearing assembly of claim 9, wherein said glass fiber fabric is made up of approximately 65 percent by weight of glass fiber fabric and approximately 35 percent by weight of phenolic resin.

11. The bearing assembly of claim 1, wherein each of said adhesive layers is made up of approximately 40 percent by weight of phenolic resin, approximately 40 percent by weight of feldspath powder, and approximately 20 percent by weight of acetone.

12. The bearing assembly of claim 6, wherein said laminated foil has a thickness of between approximately 0.3 and 0.6 mm., the ratio of the thickness of white metal foil to that of steel foil lying in the range from between approximately 1:1 to approximately 1:1.5.

13. The bearing assembly of claim 7, wherein said synthetic resin foil has a thickness of between approximately 0.3 and 0.6 mm.